United States Patent
Kamei et al.

(10) Patent No.: US 6,943,912 B1
(45) Date of Patent: Sep. 13, 2005

(54) IMAGE FORMING APPARATUS

(75) Inventors: Naoyuki Kamei, Nara (JP); Motohiro Hayashi, Nara (JP); Takeshi Ibuki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 867 days.

(21) Appl. No.: 09/616,009

(22) Filed: Jul. 13, 2000

(30) Foreign Application Priority Data

Jul. 15, 1999 (JP) ............................................ 11-201099

(51) Int. Cl.⁷ .............................................. G06F 15/00
(52) U.S. Cl. ..................... 358/1.16; 358/1.17; 358/1.15
(58) Field of Search .............................. 358/1.16, 1.15, 358/1.17, 1.1, 1.12, 1.13, 1.14, 404, 444, 1.11; 399/144, 1, 2, 8, 9, 13

(56) References Cited

U.S. PATENT DOCUMENTS 6,480,297 B1 * 11/2002 Suzuki et al. ............... 358/1.16
6,603,570 B2 * 8/2003 Asahi ......................... 358/1.15
6,621,592 B1 * 9/2003 Takayama et al. .......... 358/1.16

FOREIGN PATENT DOCUMENTS

JP 7-273957 10/1995
JP 10-243175 9/1998

OTHER PUBLICATIONS

Notification of Reason for Refusal from Japan Intellectual Property for corresponding Japanese Application No. 11-201099, mailed Aug. 24, 2004 (2 pages).

* cited by examiner

Primary Examiner—Twyler Lamb
(74) Attorney, Agent, or Firm—Edwards & Angell, LLP; David G. Conlin; Lisa Swiszcz Hazzard

(57) ABSTRACT

An image forming apparatus is provided which is capable of storing image data regardless of remaining free area of a memory associated with a specified function. The digital image forming apparatus comprises a facsimile memory for storing transmission/reception data by a memory transmission/reception function of a facsimile, a copying memory for storing copying data by a copying/printing function or externally inputted data, and a compression/expansion converting section which converts transmission/reception data stored in the facsimile memory by the memory transmission/reception function into data suitable for communication via a communication line, wherein a CPU working as storage control means is disposed which, when storing data by one function of a plurality of functions into a memory associated with the function, stores the data into a memory associated with another function in the case where all the data cannot be stored into the associated memory.

4 Claims, 5 Drawing Sheets

IMAGE FORMING APPARATUS

BACKGROUND OF THE INVENTION

1. Field of the Invention

The present invention relates to an image forming apparatus comprising a facsimile memory for storing transmission/reception data by a memory transmission/reception function of a facsimile and a copying memory for storing copying data or externally inputted data by a copying/printing function.

2. Description of the Related Art

In a conventional digital image forming apparatus which is called a digital composite machine and provided with a fax mode and a copy mode (copying function or printing function), an operation panel for setting conditions of the fax and copy modes is integrated with a control function thereof.

However, although the control function is integrated with the operation panel, memories associated with the respective functions individually work. Therefore, in the fax mode, when a memory for memory reception becomes full, a reception state is put into a busy state, or data not yet outputted is erased because reception data in the memory is overwritten. Such a phenomenon frequently happens particularly when recording sheets such as sheets of paper in a paper-feed cassette or rolls of paper run out in the nighttime or when a supply item such as toner is replaced.

Further, in the copy mode, a technique utilizing memory copying for increasing the speed of reading documents in image processing is used, however, when a memory for document information becomes full, reading of the following document is stopped, and therefore the document reading speed cannot be increased.

Japanese Unexamined Patent Publication JP-A 10-243175 (1998) discloses a technique of checking the remaining free area of a memory and controlling so as to allow a copy operation when a document size read in the following operation is within the remaining free area of the memory, whereas so as not to accept a reading request when the document size is larger.

As mentioned above, the conventional digital image forming apparatus checks the remaining free area of a memory and controls so as to allow a copy operation when a document size read in the following operation is within the remaining free area of the memory, whereas so as not to accept a reading request when the document size is larger. Therefore, the apparatus raises a problem such that when a memory has only a little or no free area, the following operation can not be carried out, or data not yet outputted is erased because of overwriting.

SUMMARY OF THE INVENTION

An object of the present invention is to provide an image forming apparatus which is capable of storing data of an image regardless of remaining free area of memories associated with functions, respectively.

The invention provides an image forming apparatus comprising memories associated with two or more functions, respectively, for storing data relating to the corresponding function, the image forming apparatus further comprising storage control means for controlling storage of data into the memories so that in the case where data relating to one of the functions should be stored in a memory associated with the function while all the data relating to the function cannot be stored in the memory associated with the function, at least part of the data relating to the function is stored in a memory associated with another function.

According to the invention, even in the case where all data relating to a function in operation cannot be stored in a memory associated with the function, at least part of the data is stored in a memory associated with another function. Therefore, it is possible to continuously operate the function in operation without suspending.

In the image forming apparatus of the invention it is preferable that two of the memories associated with two or more functions, respectively, are a facsimile memory for storing data of an image transmitted/received by a memory transmission/reception function of a facsimile and a copying memory for storing data of an image to be copied by a copying/printing function or data of an externally inputted image.

According to the invention, since the amount of data stored in the copying memory is large in the daytime when the copying/printing function is often used and the amount of data stored in the facsimile memory is large in the nighttime when output sheets are likely to be exhausted, it is possible to share such memories used in different conditions and thereby operate the respective functions with small capacity of memories without suspending the functions.

In the image forming apparatus of the invention it is preferable that the image forming apparatus further comprises a compression/expansion conversion section for converting data to be stored in the facsimile memory into data suitable for communication via a communication line, and when storing data of an image relating to the copying/printing function and including half tone, into the facsimile memory, the storage control means controls storage of the data of the image so that the data is stored in the facsimile memory without conversion of the data by the compression/expansion converting section.

According to the invention, data of the image relating to the copying/printing function and including half tone is stored in the facsimile memory without being subjected to compression conversion by the compression/expansion converting section. Therefore, it is possible to execute copying an output of data of an image including half tone with fidelity to the original data.

In the image forming apparatus of the invention it is preferable that the image forming apparatus further comprises a compression/expansion converting section for converting data to be stored in the facsimile memory into data suitable for communication via a communication line, and when storing data of an image relating to the copying/printing function and externally inputted, into the facsimile memory, the storage control means controls storage of the data so that the data is stored into the facsimile memory after compression conversion of the data by the compression/expansion converting section.

According to the invention, externally inputted data composed of text data (binary-value data) without halftone data is subjected to compression conversion by the compression/expansion converting section and stored in the facsimile memory. Therefore, it is possible to store a large amount of externally inputted data in the facsimile memory.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
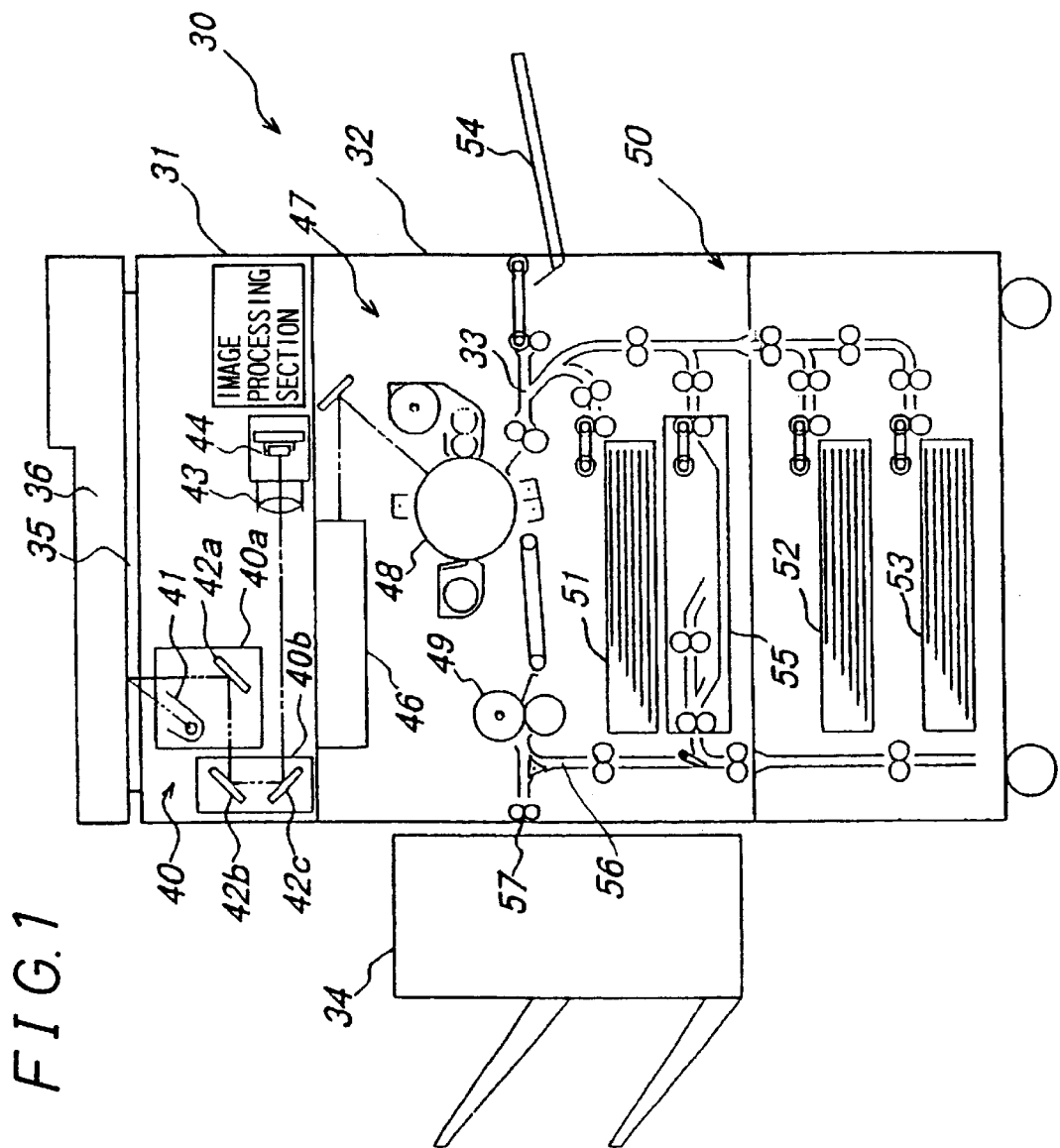
FIG. 1 is a sectional view showing an embodiment of a digital composite machine, which is an image forming apparatus of the present invention.

Now referring to the drawings, preferred embodiments of the invention are described below.

An embodiment of a digital composite machine provided with a fax mode and a copy mode (copying mode, printing mode), which is an image forming apparatus of the present invention, will be explained referring to FIGS. 1 to 5.

FIG. 1 is a sectional view showing the entire mechanical construction of a digital composite machine 30 of the embodiment. As shown in FIG. 1, the digital composite machine 30 is composed of a scanner section 31 and a laser recording section 32.

The scanner section 31 is composed of a document glass 35 made of transparent glass, a recirculating automatic document feeder 36 (referred to as an RADF hereafter) for automatically supplying and conveying a document onto the document glass 35, and a document image reading unit for operating and reading an image of a document put on the document glass 35, that is, a scanner unit 40.

A document image read by the scanner section 31 is sent as image data to an image processing section 1 mentioned later, where the image data is subjected to predetermined image processing.

The RADF 36 is a device which automatically feeds a plurality of documents set on a specified document tray at a time, one by one onto the document glass 35 of the scanner unit 40. Further, in order to cause the scanner unit 40 to read one side or both sides of a document in response to a selection of the user, the RADF 36 is composed of a conveying path for a one-side document, a conveying path for a both-side document, conveying path switching means, and so on.

The scanner unit 40 is composed of a lamp reflector assembly 41 which exposes the surface of a document, a first scanning unit 40a formed by a first reflection mirror 42a for guiding a reflected light image from the document to a photoelectric conversion device 44 embodied by a CCD or the like, a second scanning unit 40b formed by second and third reflection mirrors 42b, 42c for guiding the reflected light image from the first scanning unit 40a to the photoelectric conversion device 44, an optical lens member 43 for forming an image of the reflected light image onto the photoelectric conversion device 44, and the photoelectric conversion device 44 which converts the formed image of the reflected light image into electric image signals.

The scanner section 31 is constructed so as to, while documents to be read are sequentially put onto the document glass 35 by a related operation of the RADF 36 and the scanner unit 40, move the scanner unit 40 along the lower surface of the document glass 35 and read images of the documents. Image data obtained by reading an image of a document by the scanner unit 40 is sent to the image processing section 1 mentioned later and subjected to a variety of processes. After that, the image data is supplied to a laser writing unit 46 of the laser recording section 32, and reproduced as a visible image onto a photoconductor drum 48 in an electrophotographic process. Then, the image is transferred and formed onto a recording sheet.

The laser recording section 32 includes a paper-sheet housing/conveying section 50, the laser writing unit 46, and an electrophotographic process section 47 for forming an image. The paper-sheet housing/conveying section 50 has a first cassette 51, a second cassette 52, a third cassette 53 and a multiple manual feed tray 54, and moreover has a double-side copying unit 55 for recording an image onto the rear side of a paper sheet with an image recorded on one side sent out of one of the cassettes or the tray.

In the respective cassettes of the paper-sheet housing/conveying section 50, batches of paper sheets are housed for each size. When the user selects one of the cassettes which houses paper sheets of desirable size, the paper sheets are sent out of the cassette one by one from the top of the batch thereof, and sequentially conveyed toward an image forming section of the laser recording section 32 via a conveying path 59.

The laser writing unit 46 has a semiconductor laser which emits laser light according to image data from a memory, a polygon mirror which deflects the laser light at an equal velocity, an f-θ lens which corrects so as to be deflected at an equal velocity, and so on.

The electrophotographic process section 47 is composed of a charging device, a developing device, a transferring device, a separating device, a cleaning device, a discharging device and a fixing device 49, which are placed around the photoconductor drum 48 in accordance with well-known configurations. A sheet carrying-out conveying path is placed on the downstream side in the direction of conveying a paper sheet onto which an image should be formed from the fixing device 49. The sheet carrying-out conveying path is branched to a conveying path 57 which leads to an after-process device 34 and a conveying path 56 which leads to a double-side copying unit 55.

In the laser writing unit 46 and the electrophotographic process section 47, image data read out of an image memory is formed as an electrostatic latent image onto the surface of the photoconductor drum 48 by scanning laser light by the laser writing unit 46, and a toner image made to be a visible image by toner is electrostatically transferred and fixed onto the surface of a recording sheet conveyed from a multistage paper feeding unit 33.

The recording sheet with an image formed thereon in this manner is selectively conveyed from the fixing device 49 to the after-process device 34 via the conveying path 57 or to the double-side copying unit 55 via the conveying path 56. The after-process device 34, in which a first discharge tray 341 and a second discharge tray 342 are vertically placed on the left side of the apparatus, receives a recording sheet with an image recorded thereon in the digital composite machine 30 from the conveying path 57.

Figure 2:
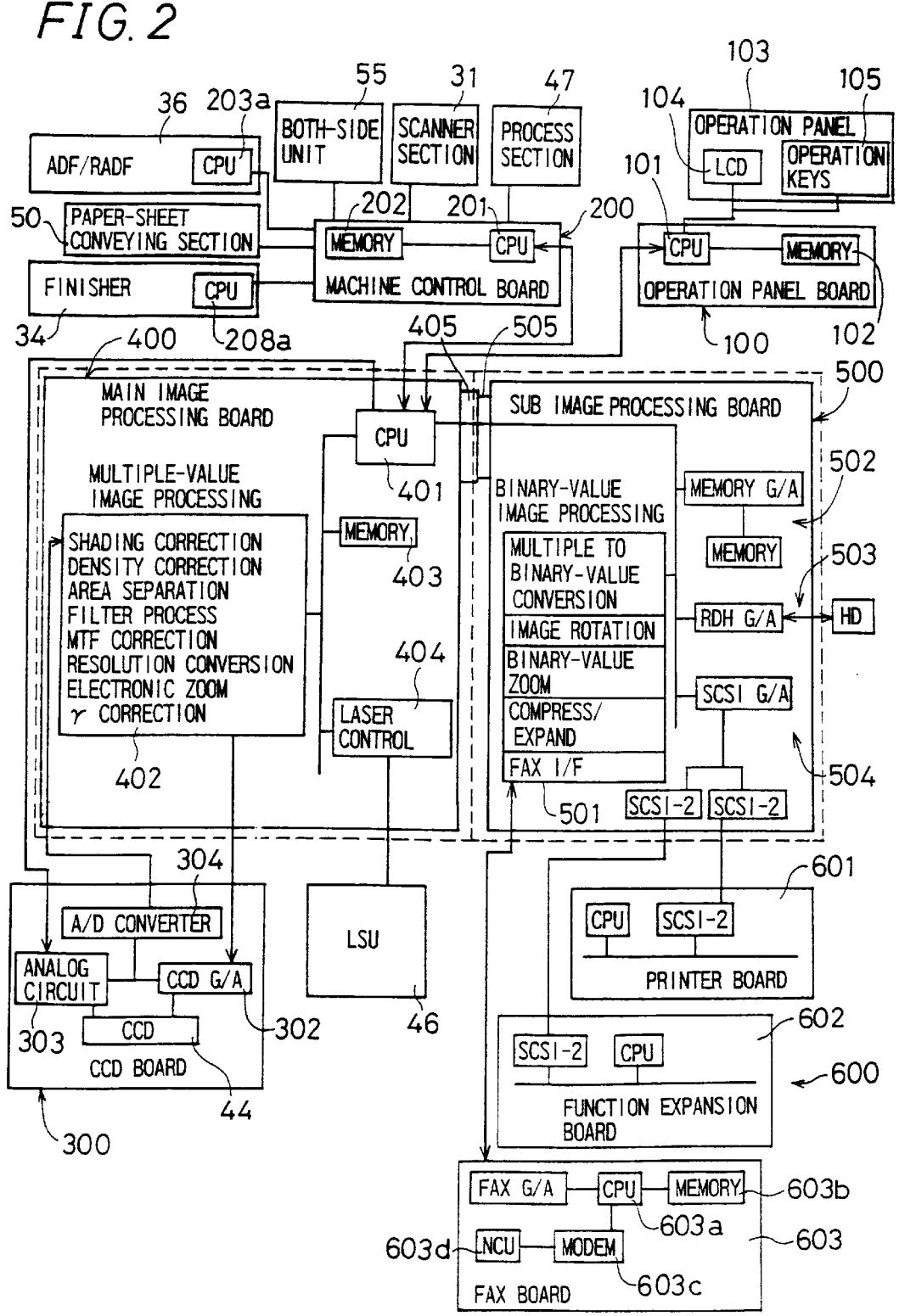
FIG. 2 is a block diagram showing a control block of the digital composite machine of FIG. 1.

FIG. 2 is an electric configuration block diagram showing a variety of units composing the digital composite machine 30 of FIG. 1, the image processing section, and so on. This is a view showing a state of controlling an operation by a main central processing unit (main CPU) 401 placed substantially in the center through coordination with sub central processing units (sub CPUs) mounted for each unit section.

It is apparent from this configuration block diagram that the digital composite machine is mainly composed of an operation panel board 100 which locates substantially at the upper right on the drawing and controls an operation panel 103, a machine control board 200 which locates substantially at the upper left on the drawing and controls the respective unit sections constructing the digital composite machine 30, a CCD board 300 which locates substantially at the lower left on the drawing and electrically reads a document image to convert it into electronic data, a main image processing board 400 which locates substantially in the center on the drawing and subjects the document image converted into electronic data by the CCD board 300 to predetermined image processing, a sub image processing board 500 which further subjects the image information processed by the main image processing board 400 to predetermined image processing, a group of other expansion boards 600 (a printer board 601, a function expansion board 602, a facsimile board 603) which locate substantially at the lower right on the drawing and are connected with the image processing board 500 via an interface, and so on.

In the following, what is controlled by each board will be explained.

Operation Panel Board 100

The operation panel board 100, which is controlled basically by a sub CPU 101, controls a display screen of an LCD display 104 placed on the operation panel 103, operation input through a group of operation keys 105 for inputting directions regarding a variety of modes, and so on. Further, a memory 102 for storing various control information for the operation panel such as data inputted through the group of operation keys 105 and information displayed on the LCD screen 104 is disposed.

In this configuration, the sub CPU 101 performs control data communication with the main CPU 401 to give directions on the operation of the digital composite machine 30. Further, the main CPU 401 transfers a control signal showing an operation state of the digital composite machine 30 to the sub CPU 101, whereby the LCD screen 104 of the operation panel 103 displays a current operation state of the apparatus for the user.

Machine Control Board 200

The machine control board 200, which is entirely controlled by the sub CPU 201, controls automatic document feeders 36 such as an ADF and an RADF, a scanner section 31 which reads a development image, an electrophotographic process section 47 which reproduces image information as an image, a paper-sheet housing/conveying section 206 which sequentially conveys sheets of paper on which images should be recorded from cassettes or a tray toward a process section 205, a double-side copying unit 55 which reverses recording sheets with images recorded thereon and conveys the recording sheets in reverse so that images are formed on both the sides of the recording sheets, a finisher 34 which performs an after-process such as stapling the recording sheets with images recorded thereon, and so on.

CCD Board 300

The CCD board 300 is composed of a CCD 301 including an photoelectric conversion device 40 for electrically reading a document image, a circuit (CCD gate array) 302 which drives the CCD 301, an analog circuit 303 which adjusts the gain of analog data outputted from the CCD 301, an A/D converter 304 which converts analog outputs of the CCD 301 into digital signals and outputs as electronic data, and so on. The CCD board is controlled by the main CPU 401.

Main Image Processing Board 400

The main image processing board 400 is controlled by the main CPU 401. The main image processing board is composed of a multiple-value image processing section 402 which, based on electronic data of a document image sent from the CCD board 300, so as to express the contrast of the image in a desirable state, subjects the multiple-value image data to shading correction, density correction, area separation, filter process, MTF correction, resolution conversion, electronic zoom (scaling process), gamma correction and the like, a memory 403 for storing processed image data or various control information on control of the procedure of processes, a laser control 404 which controls so as to transfer data toward the laser writing unit 46 in order to reproduce an image with processed image information, and so on.

Sub Image Processing Board 500

The sub image processing board 500 is connected with the main image processing board 400 by connectors 505, 405. The sub image processing board is composed of a binary-value image processing section 501 controlled by the main CPU 401 on the main image processing board 400, a gate array 503 which controls a hard disk for storing binary-value image information subjected to image processing or control information on processes and producing a plurality of copies by repeatedly reading out a plurality of document images by a desirable copy number, a gate array 504 which controls a SCSI serving as an external interface, and so on.

Further, the above-mentioned binary-value image processing section 501 is composed of a processing section which converts multiple-value image information into a binary-value image, a processing section which rotates an image, a binary-value scaling (zoom) processing section which subjects a binary-value image to a scaling process, and so on. The binary-value image processing section further includes a fax interface so as to be capable of transmitting/receiving a fax image via communication means.

Expansion Board 600

The expansion boards 600 are a printer board 601 which enables data sent from a personal computer and the like to be outputted from a printer section of the digital composite machine in a printing mode, a function expansion board 602 for expanding an editing function of the digital composite machine and effectively using the characteristics of the digital composite machine, a facsimile board 603 which enables a document image read from the scanner section of the digital composite machine to be transmitted to the counterpart and enables image information sent from the counterpart to be outputted from the printer section of the digital composite machine, or the like.

In the following, regarding the image processing apparatus of the digital composite machine, image data processing in a fax mode and the flow of image data will be explained in more detail.

Fax Mode

The fax mode includes a process for transmission of a document to the counterpart and a process for reception of a document from the counterpart.

First, transmission of a document to the counterpart will be explained. Transmission documents set on a predetermined position of the RADF 36 of the digital composite machine 30 are sequentially supplied one by one onto the document glass 35 of the scanner unit 40, sequentially read by the configuration of the scanner unit 40 of images of transmission documents as explained before, and transferred to the main image processing board 400 as 8 bits of electronic data. The 8 bits of electronic data transferred to the main image processing board 400 is subjected to predetermined processing on the multiple-value image processing section 402 as 8 bits of electronic image data.

Then, the 8 bits of electronic image data subjected to processing are sent from the connector 405 on the side of the main image processing board 400 to the sub image processing board 500 via the connector 505 on the side of the sub image processing board 500. In a multiple-to-binary value conversion section of the binary-value image processing section 501, the 8 bits of electronic image data is subjected to processes such as error diffusion and converted from 8 bits of electronic image data into 2 bits of electronic image data.

Here, the reason for converting 8 bits of electronic image data into 2 bits of electronic image data together with executing processes such as error diffusion is that there is a problem in image quality in the case of only executing multiple-to-binary value conversion and therefore it is considered to reduce degradation of image quality.

In this way, transmission document image data converted into a binary-value image is compressed in a specified form and stored in a memory 502 on the sub-image processing board. Then, when a transmission procedure with the counterpart is performed and a transmittable state is ensured, transmission document image data compressed in a specified form and read out of the memory 502 is transferred to the facsimile board 603, subjected to necessary processes such as change of a compression form on the facsimile board 603, and sequentially transmitted to the counterpart via a communication line.

Next, the processing of a document image transmitted from the counterpart will be explained.

When a document image is transmitted from the counterpart via a communication line, image data transmitted from the counterpart is received while a communication procedure on the facsimile board 603 is performed, the image data compressed in a specified form is sent from a fax interface disposed to the binary-value image processing section 501 of the sub image processing board 500 to the binary-value image processing section 501, and the transmitted document image is reproduced as a page image by a compress/expansion processing section or the like.

Then, the document image reproduced as an image by page is transferred to the main image processing board 400 and subjected to gamma correction, and the writing of an image is controlled by the laser control 404 so as to reproduce an image by the LSU 406.

As is evident from the above configuration, a processing section-for subjecting image information to a predetermined process is mainly divided into the main image processing board 400 which processes a document image read and inputted from the scanner section 31 as multiple-value image information, and the sub image processing board 500 which-subjects the document image information processed as multiple-value image information on the main image processing board 400 to a predetermined process such as a binary-value process and subjects image information sent from an equipment connected via an external interface to a predetermined process, thereafter transferring to the multivalue image processing section (the main image processing board 400). Further, the image processing section 1 which actually processes image data in FIG. 1 is divided into the multiple-value image processing section 402 on the main image processing board 400 and the binary-value image processing section 501 on the sub image processing board in FIG. 2.

Further, the main image processing board 400 includes the laser control 404 for controlling the writing of image information of the laser writing unit 46, in order to reproduce an image from the laser writing unit 46 onto the photoconductor drum 48 of the electrophotographic process.

With this configuration, it is possible to reproduce a document image read and inputted from the scanner section 31 as a copy image from the laser recording section 32 without impairing image characteristics which the document has as a multiple-value image. For example, in the case of outputting a large amount of documents at high speed by using an electronic RDH function, the sub image processing board 500, the hard disk 503, and so on are used.

Furthermore, in so far as the processing, outputting and faxing of image information from external equipment such as a fax or a printer are concerned, it is possible to apply an appropriate process to image information in accordance with a digital feature function given to the digital composite machine 30, for example, a binary-value process to a transmission document subjected to a multiple-value image process and a transmission document whose document image characteristics are kept.

Still further, separate placement of components concerning image processing on a plurality of boards makes it possible to prepare a variety of digital composite machines 30 and install a digital image forming apparatus in response to a request from the user. Moreover, after installment, it is possible to roll out systems with ease in response to a request from the user.

Next, since the main CPU 401 placed on the main image processing board 400 also controls the sub image processing board 500 in the above configuration, the flow of all image data continuously processed in the respective processing sections on the main and sub image processing boards is controlled, and the flow of data and process also becomes smooth. Therefore, image data would not be lost.

Up to this point, the scanner section 31 mounted in the digital composite machine 30, or the image processing section 700 which processes image data inputted from the external interface 600 has been explained.

Figure 3:
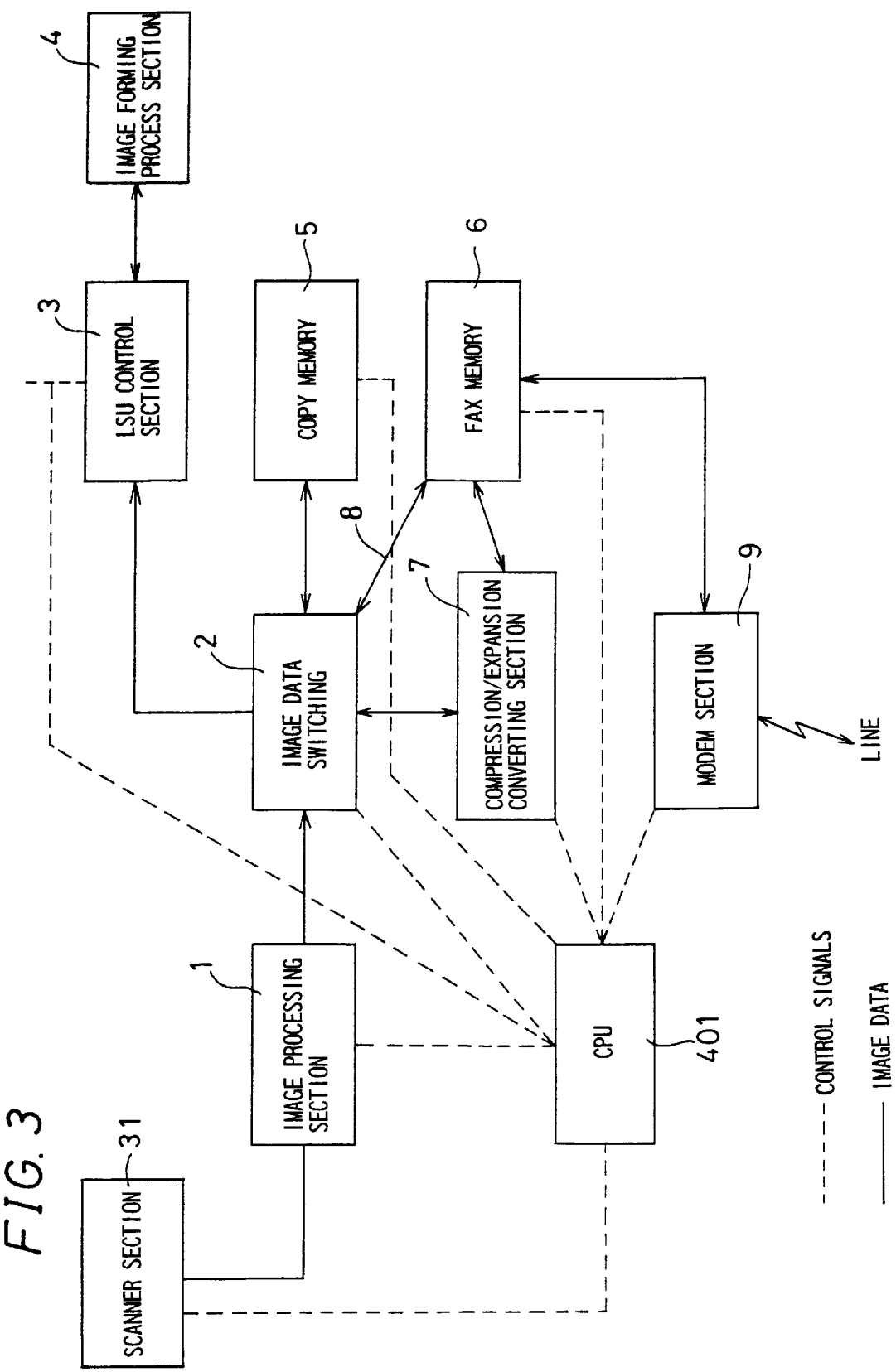
FIG. 3 is an explanation view showing a flow of image data and control signals in the digital composite machine of the invention.

FIG. 3 is a block diagram showing sections which relate to a facsimile function and a copy function of the embodiment extracted from the configuration of the above-mentioned digital composite machine 30 of FIG. 2.

Sections which relate to a facsimile mechanism and a copy mechanism in the digital composite machine 30, in terms of function, includes the scanner section 31, the CPU 401 of the main image processing board, the image processing section 1, an image data switching section 2, an LSU control section 3, an image forming processing section 4, a memory for copying 5, a fax memory 6, a compression/expansion converting section 7, a bypass line 8 and a modem section 9.

The image processing section 1 of FIG. 3 corresponds to the multiple-value image processing section 402 and the binary-value image processing section 501 of FIG. 2. The image data switching section 2 of FIG. 3 corresponds to one function of the CPU 401 of the main image processing board of FIG. 2. The LSU control section 3 of FIG. 3 corresponds to the laser control 404 of FIG. 2. The image forming processing section 4 of FIG. 3 corresponds to the laser recording section 32 of FIG. 1 including the LSU of FIG. 2. The memory for copying 5 and the fax memory 6 of FIG. 3 correspond to memory areas in the memory 502 on the sub image processing board of FIG. 2, respectively. The compression/expansion converting section 7 of FIG. 3 corresponds to one function in the binary-value image processing section 501 of FIG. 2. The modem section 9 of FIG. 3 corresponds to the whole fax board of FIG. 2. The CPU 401 of the main image processing board also works as a storage control section for controlling data storage into the memory for copying 5 and the fax memory 6.

In a general copy mode, image data read by the scanner section 31 is subjected to image processing in the image processing section 1 and thereafter supplied from the image data switching section 2 to the image forming processing section 4 via the LSU control section 3. Together with an image forming process thereof, the reading of the image data is performed.

On the other hand, in a memory copy mode, after being subjected to an image forming process in the image processing section 1, image data read by the scanner section 31 is once held into the memory for copying 5 from the image data switching section 2, sequentially read out in response to the image forming speed, and supplied from the image data switching section 2 to the image forming processing section 4 via the LSU control section 3. In this manner, the reading of image data is performed in advance independently of the image forming process. Therefore, it is possible to increase the reading speed.

In this memory copy-mode, when the memory for copying 5 becomes full, image data is accumulated into the fax memory 6. Here, in the,case of being set so as to place emphasis on capacity, the image data switching section 2 supplies image data to the fax memory 6 via the compression/expansion converting section 7 which compresses image data into fax data, thereby performing accumulation by a less memory capacity with respect to one unit of image data.

On the contrary, in the case of being set so as to place emphasis on image quality, the image data switching section 2 supplies image data without compression directly to the fax memory 6 via the bypass line 8 which bypasses the compression/expansion converting section 7, thereby performing accumulation by the same image quality as image data accumulated in the memory for copying 5.

Further, in a fax transmission mode, after being subjected to image processing in the image processing section 1, image data read by the scanner section 31 is supplied from the image data switching section 2 to the compression/expansion converting section 7 to be compressed. After that, the image data is transmitted from the modem section 9 to a line via the fax memory 6. In a direct transmission mode, the reading of image data is performed together with transmission of image data. On the contrary, in a memory transmission mode, the reading of image data is performed in advance independently of transmission, and image data of the difference from a transmission output is accumulated in the fax memory 6.

In this manner, the memory for copying 5 and the fax memory 6 are shared, and the operations as mentioned above are controlled by the main CPU 401.

Figure 4:
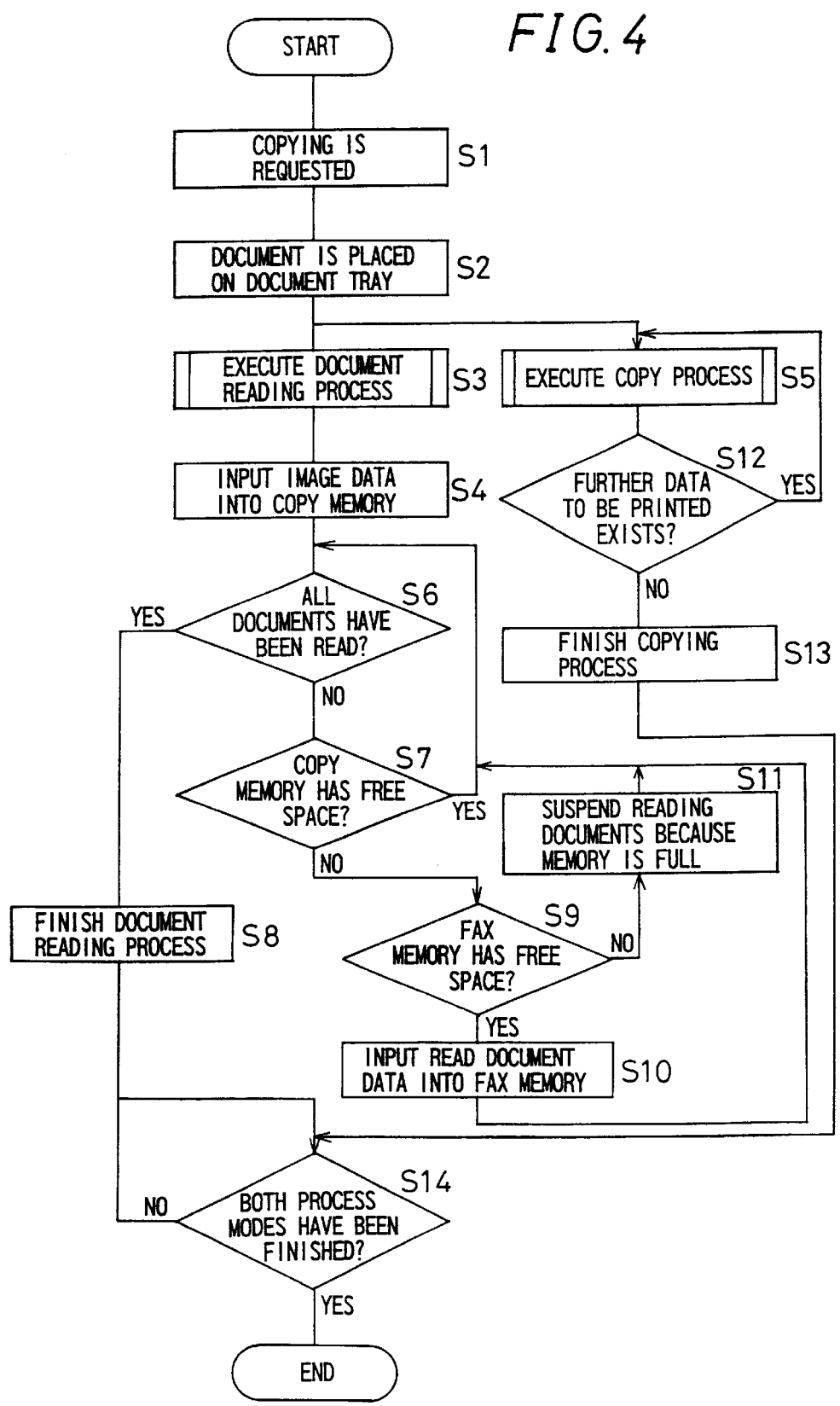
FIG. 4 is a flow chart explaining a copy operation in the digital composite machine of the invention.

FIG. 4 is a flow chart specifically showing the operation in the copy mode. First, when a copy request is made (S1) and documents are set on a document tray (S2), the reading of the documents is started (S3), and the read image data is subjected to image processing and input of the image data into the memory for copying 5 is started (S4). In parallel with the reading of the documents and storage of the image data, a copy process for outputting images onto sheets of paper is started (S5).

In parallel with the reading of the documents and input of the image data, it is judged whether all the document have been read or not (S6). In the case where all the documents have not been read, it is judged whether or not the memory for copying 5 has a free area (S7). When a free area is available, the operation goes back to step S6. During a time that step S7 is affirmed, the operation of reading the documents is continued until all the documents are read. When the reading of all the documents is finished at step S5, the document reading process is finished (S8) When the memory for copying 5 becomes full at step S7, it is judged whether or not the fax memory 6 has a free area (S9). When a free area is available, the image data is inputted and recorded in the fax memory 6 (S10) and the operation goes back to step S6. During a time that step S7 is denied, the reading of the documents is continued as long as the fax memory 6 has a free area.

At step S9, in the case where free area of the fax memory 6 is exhausted, the reading of the documents is once stopped because the memory is full (S11).

On the other hand, in the copy process executed in parallel with input of the image data, it is judged whether the following copy data exist or not (S12). In the case where the following copy data exist, the operation goes back to step S5, where the copy process is performed until all the copy data is processed. When all the copy data is processed, the copy process is finished (S13).

When both the document reading process and the copy process executed in parallel are finished at steps S8 and S13, all the operations are finished (S14). In the case where either process has not been finished, the operation goes back to step S3 or step S5.

Figure 5:
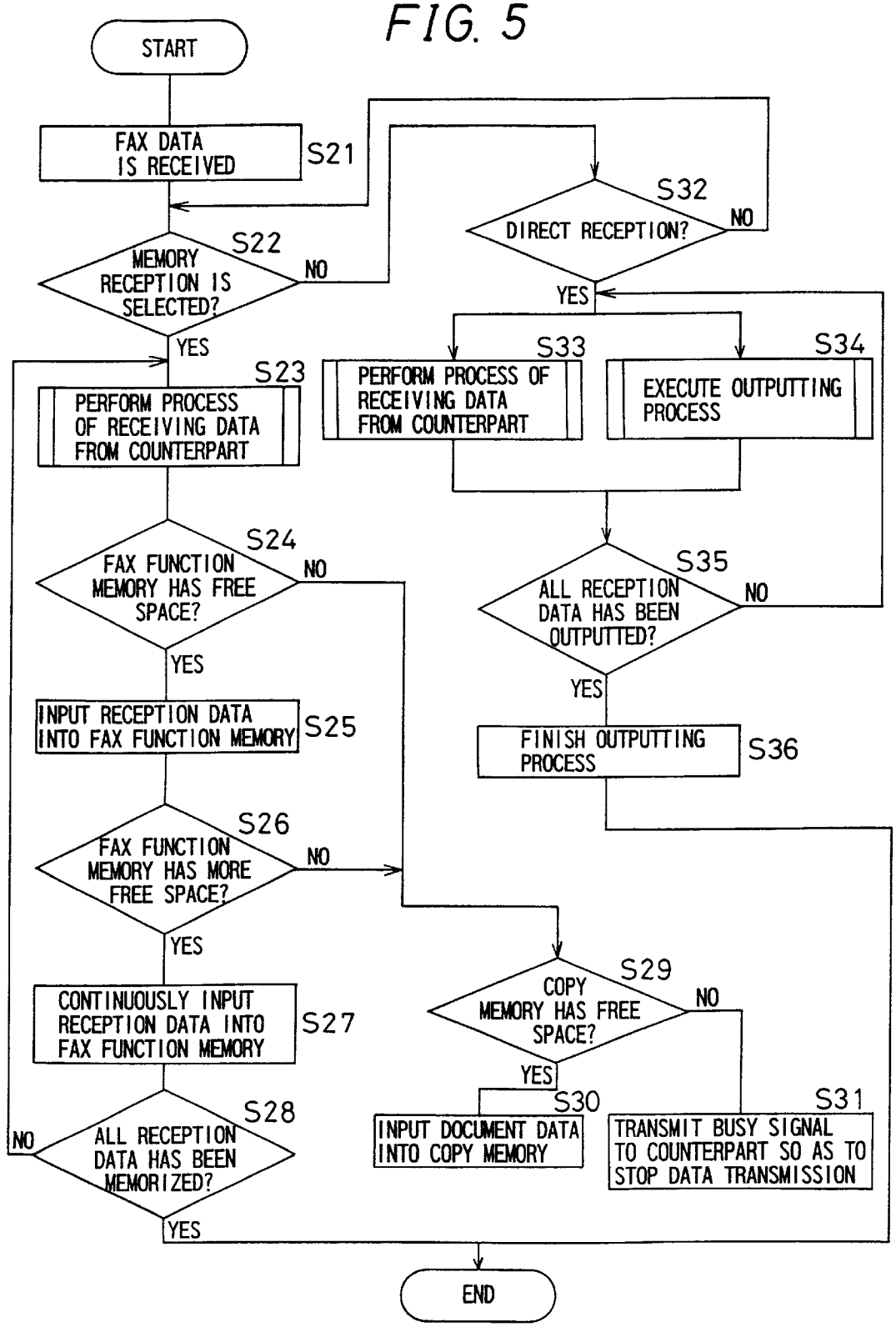
FIG. 5 is a flow chart explaining a fax receiving operation in the digital composite machine of the invention.

FIG. 5 is a flow chart specifically showing the operation in the fax reception mode. When fax data is received (S21), it is judged whether memory reception is selected or not (S22) In the case where memory reception is selected, a receiving process is started (S23). It is judged whether or not the fax memory 6 has a free area (S24), and in the case where a free area is available, reception data is continuously accumulated in the fax memory 6 (S25). Then, it is judged again whether or not the fax memory 6 has a free area (S26), and in the case where a free area is available, reception data is continuously accumulated in the fax memory 6 (S27).

Then, it is judged whether all the reception data has been accumulated or not (S28), and the operation from step S23 to S28 is repeatedly performed until all the reception data is accumulated.

In the case where it is judged at step S24 or S26 that the facsimile memory 6 has no memory, it is judged whether or not memory for copying 5 has a free area (S29). In the case where a free area is available, reception data is accumulated in the memory for copying 5. In the case where it is judged at step S29 that the memory for copying 5 has no free area, a busy signal is outputted to the transmission counterpart so as to stop transmission for a brief period of time (S31).

On the other hand, in the case where it is judged at step S22 that memory reception is not selected, it is judged whether direct reception is selected or not (S32). In the case where direct reception is not selected, the operation goes back to step S22. In the case where direct reception is selected, parallel execution of a process of receiving data from the counterpart (S33) and an image outputting process (S34) is started.

Then, it is judged whether all the reception data has been outputted or not (S35). In the case where all the reception data has not been outputted, the operation goes back to steps S33 and S34, whereas in the case where all the reception data has been processed, the outputting process is finished (S36) to finish all the operations.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus comprising:

memories associated with two or more functions, respectively, for storing data relating to the corresponding function, the image forming apparatus further comprising:

storage control means for controlling storage of data into the memories so that in the case where data relating to one of the functions should be stored in a memory associated with the function while all the data relating to the function cannot be stored in the memory associated with the function, at least part of the data relating to the function is stored in a memory associated with another function.

2. The image forming apparatus of claim 1, wherein two of the memories associated with two or more functions, respectively, are a facsimile memory for storing data of an image transmitted/received by a memory transmission/reception function of a facsimile and a copying memory for storing data of an image to be copied by a copying/printing function or data of an externally inputted image.

3. The image forming apparatus of claim 2, further comprising:

a compression/expansion conversion section for converting data to be stored in the facsimile memory into data suitable for communication via a communication line, wherein when storing data of an image relating to the copying/printing function and including half tone, into the facsimile memory, the storage control means controls storage of the data of the image so that the data is stored in the facsimile memory without conversion of the data by the compression/expansion converting section.

4. The image forming apparatus of claim 2, further comprising:

a compression/expansion converting section for converting data to be stored in the facsimile memory into data suitable for communication via a communication line, wherein when storing data of an image relating to the copying/printing function and externally inputted, into the facsimile memory, the storage control means controls storage of the data so that the data is stored into the facsimile memory after compression conversion of the data by the compression/expansion converting section.

* * * * *